(12) United States Patent
Colmenarez et al.

(10) Patent No.: US 6,931,147 B2
(45) Date of Patent: Aug. 16, 2005

(54) MOOD BASED VIRTUAL PHOTO ALBUM

(75) Inventors: Antonio Colmenarez, Peekskill, NY (US); Miroslav Trajkovic, Ossining, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 660 days.

(21) Appl. No.: 10/014,231

(22) Filed: Dec. 11, 2001

(65) Prior Publication Data

US 2003/0108241 A1 Jun. 12, 2003

(51) Int. Cl.$^7$ ............................................... G06K 9/00
(52) U.S. Cl. .......................................... 382/118; 707/4
(58) Field of Search ........................ 382/181, 305–306, 382/100, 115, 118; 707/1–5, 104.1

(56) References Cited

U.S. PATENT DOCUMENTS

| | | | |
|---|---|---|---|
| 5,367,454 A | 11/1994 | Kawamotot et al. ...... | 364/419.2 |
| 5,895,464 A | 4/1999 | Bhandari et al. .............. | 707/3 |
| 6,629,104 B1 * | 9/2003 | Parulski et al. ............. | 707/102 |
| 6,721,741 B1 * | 4/2004 | Eyal et al. ..................... | 707/10 |
| 2003/0117651 A1 * | 6/2003 | Matraszek et al. ......... | 358/1.18 |
| 2003/0156304 A1 * | 8/2003 | Fedorovskaya et al. ..... | 358/527 |

OTHER PUBLICATIONS

Kuchinsky et al, "FotoFile: A Consumer Multimedia Organization and Retrieval System", CHI 1999, Pittsburgh PA USA, ACM 1999 0–201–48559–1, pp. 496–503.*

Lang et al, "Looking at Pictures: Affective, facial, visceral, and behavioral reactions" Psychophysiology, 1993, pp. 261–273.*

Essa et al, "Facial Expression Recognition using a Dynamic Model and Energy", International Conference on Computer Vision '95, Cambridge, MA, Jun. 20–23, 1995.*

Black et al, "Tracking and Recognizing Rigid and Non–rigid Facial Motions using Local Parametric Models of Images Motions", IEEE, ISBN 0–8186–7042–8, pp. 374–381, 1995.*

"MPEG–FAQ: multimedia compression [4/9]", http://www./faqs.org/faqs/mpeg–faq/part4/.*

Schafer et al: "Recommender systems in e–commerce" Proceedings ACM Conference On Electronic Commerce, 1999, pp. 158–166.

\* cited by examiner

Primary Examiner—Jose L. Cougo
Assistant Examiner—Tom Y. Lu
(74) Attorney, Agent, or Firm—Edward Goodman

(57) ABSTRACT

A method and system for providing a mood based virtual photo album which provides photos based upon a sensed mood the viewer. The method may include the steps of capturing a first image of a facial expression of a viewer by a camera, providing the image to a pattern recognition module of a processor, determine a mood of the viewer by comparing the facial expression with a plurality of previously stored images of facial expressions having an associated emotional identifier that indicates a mood of each of the plurality of previously stored images, retrieving a set of photos from storage for transmission to the viewer based on the emotional identifier associated with the determined mood, and transmitting the set of photos in the form of an electronic photo album. A system includes a camera, a user interface for transmitting a first image of a facial expression of a viewer captured by the camera, a processor for receiving the transmitted image by the user interface, and including a pattern recognition module for comparing the image received by the processor with a plurality of images of facial expressions from a storage area to determine a mood of the viewer. A retrieval unit retrieves a set of electronic photos corresponding to the mood of the viewer, and transmits the set of electronic photos for display as a virtual photo album.

32 Claims, 2 Drawing Sheets

MOOD BASED VIRTUAL PHOTO ALBUM

BACKGROUND OF THE INVENTION

1. Field of the Invention

The present invention relates to viewer interface related feedback systems. More particularly, the present invention relates to an optical viewer interface related feedback system.

2. Description of the Related Art

People often view photo albums when wishing to reminisce about special events or persons from the past. However, standard photo albums do not take into account the mood of the viewer as he/she pages through the pictures.

SUMMARY OF THE INVENTION

One aspect of the present invention is a method for providing a virtual photo album that can displays collections of photographs suited to the recognized mood of the viewer. This may comprise the steps of capturing a first image of a facial expression of a viewer by a camera, providing the image to a pattern recognition module of a processor, determining a mood of the viewer by comparing the facial expression with a plurality of previously stored images of facial expressions having an associated emotional identifier that indicates a mood of each of the plurality of previously stored images, retrieving a set of photos from storage for transmission to the viewer based on the emotional identifier associated with the determined mood, and transmitting the set of photos in the form of an electronic photo album.

In another aspect of the invention, a system for a mood based virtual photo album comprises a camera, user interface means for transmitting a first image of a facial expression of a viewer captured by the camera, a processor for receiving the transmitted image by the user interface means, and including a pattern recognition module for comparing the image received by the processor with a plurality of images of facial expressions from a storage area to determine a mood of the viewer according to the first image captured by the camera, retrieval means for retrieving a set of electronic photos corresponding to the mood of the viewer, and transmitting the set of electronic photos to the viewer, and a display for displaying the set of photos as a virtual photo album.

DETAILED DESCRIPTION OF THE INVENTION

Figure 1A:
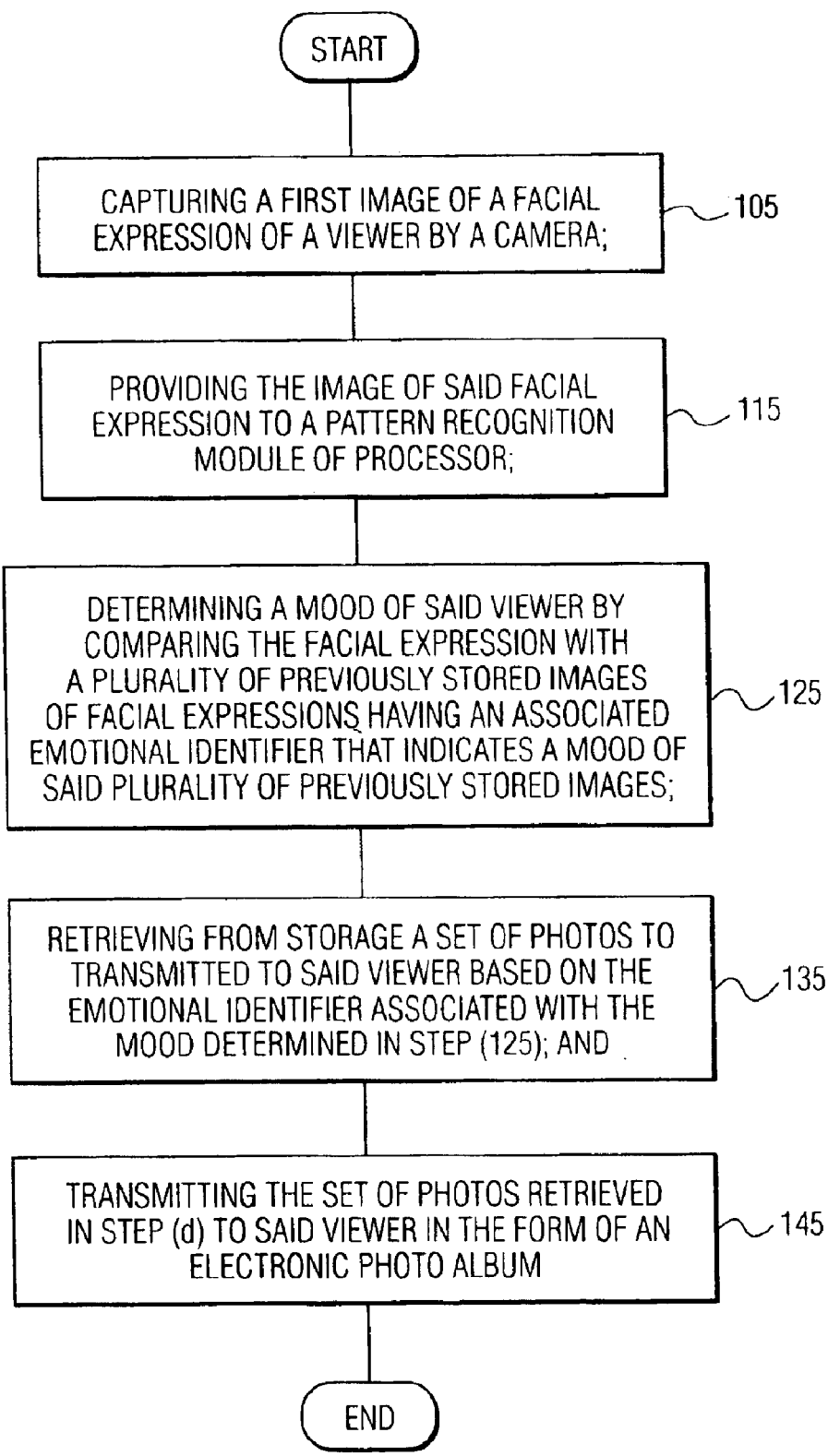
FIG. 1A is flowchart that provides an overview of a method of providing a mood based virtual photo album according to the present invention.

FIG. 1A illustrates an overview of a method for providing a virtual photo album according to the present invention.

At step 105 a first image of a viewer is captured by a camera. This image may be by any known protocol, including but not limited to JPEG, TIFF, BMP, PCX, etc. The image may also be a video sequence such as MPEG, MPEG-1, MPEG-2, MEPG-3, or any variation thereof IT could also be another format for video sequences.

At step 115 the image of the facial expression of the viewer is provided to a pattern recognition module of a processor. Although the processor can be a locally attached computer, one aspect of the present of the present invention includes a web-based processor, and the viewer activates the virtual photo album at an Internet web site. The web site could request an identifier and a password, or could store and/or update a cookie on the viewer's interface each time the web site is visited. It is also possible that another type of network other than the World Wide Web could be used, such as a LAN, WAN, etc.

At step 125, the mood of a viewer is determined by the pattern recognition. This determination is made by comparing the facial expression with a plurality of previously stored images of facial expressions having an associated emotional identifier that indicates a mood of each of the plurality of previously stored images.

At step 135, a set of photos is retrieved from a storage area, the photos corresponding to the type of mood detected in step 125. For example, if the detected mood of the viewer is sadness, the set of photos could include images of loved ones. The photos could also include photos that have been predetermined to cause a large percentage of past viewers happy.

At step 145 the set of photos is transmitted to the viewer for display as a virtual mood based photo album. The photos can be displayed serially, for a certain amount of time per photo. Optionally, a viewer could specify the length of time each photo is viewed, or indicate a request for the next photo by actively pressing the keyboard, joystick, or mouse. The photos could be initially displayed on one screen, for example, including but not limited to, a row and column format. The user would then click or point by way of a pointing device or keyboard, or enter a certain number to view a specific photo individually.

Figure 1B:
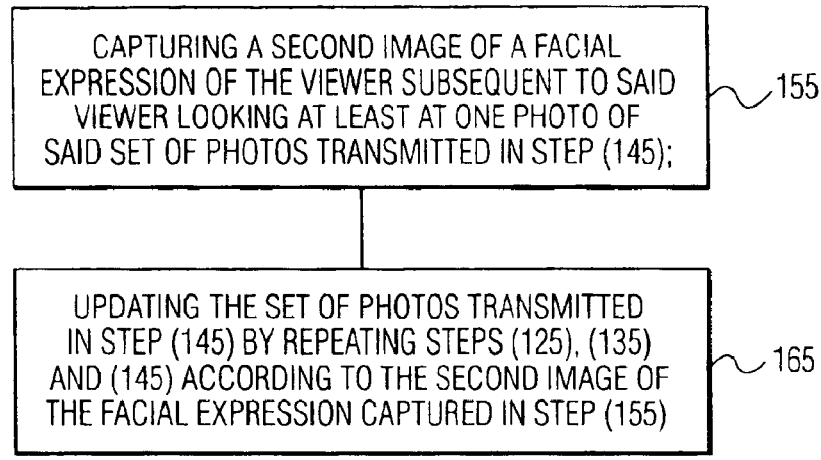
FIG. 1B is a flowchart providing additional detail to the overview shown in FIG. 1A.

FIG. 1B provides more detail regarding a feedback system used for subsequent images of facial expressions after at least one photo from the set of photos is displayed to the viewer. IT should be noted that the steps in FIG. 1B are optional.

At step 155 a second image of the facial expression of a viewer is captured by the camera. This second image is subsequent to at least one photo from said set of photos being observed by the viewer. This additional monitoring of facial expressions is a type of feedback system which is able to evaluate the reaction of the photos on the current mood of the viewer after display of at least photo.

At step 165, the set of photos is updated by repeating steps 125, 135, and 145 to obtain a modified set of photos for the virtual photo album.

Figure 2:
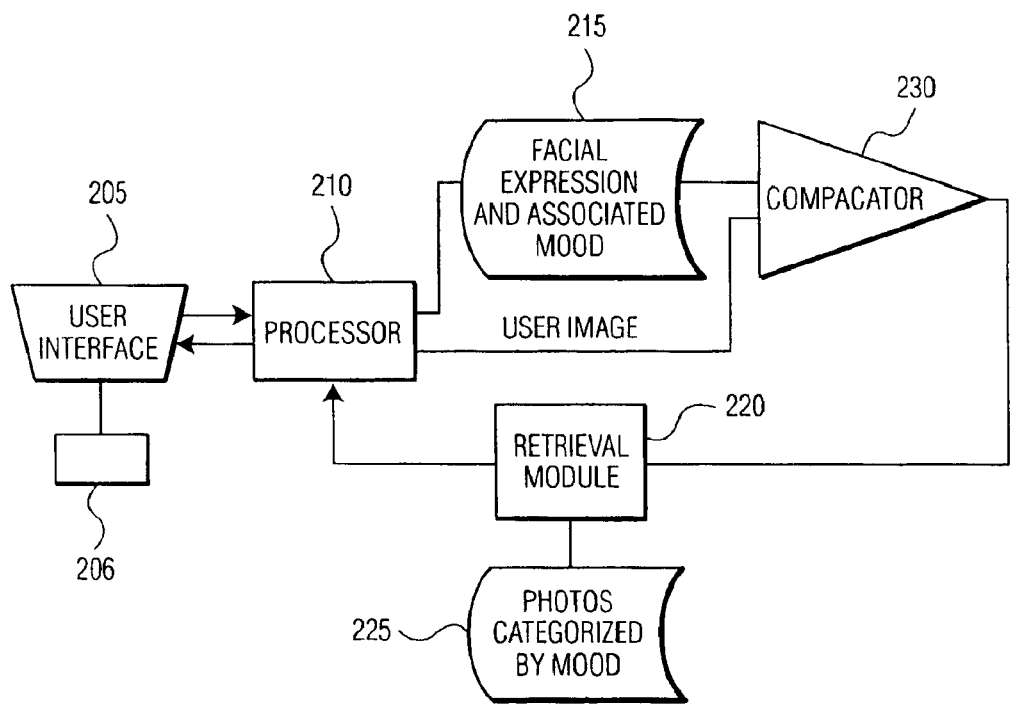
FIG. 2 is a illustration of a system for providing a virtual photo album according to the present invention.

FIG. 2 illustrates a system for providing a virtual photo album according to the present invention.

A viewer interface (UI) 205 comprises a camera 206, which communicates with a processor 210, including but not limited to, a personal computer. The camera could be either an analog or digital, and can provide one or several rapid still photos or video sequences of the viewer. The still photos could use any known conventional digital representation protocol such as JPEG, TIFF, BMP, PCX, etc. The video sequences could use any known protocol such as MPEG, MPEG-1, MPEG-2, MPEG-3, etc. The camera may communicate with the processor by any means, such as via a USB (Universal Serial Bus) port, parallel or serial port, fiber optic connection, or even a wireless connection.

The processor 210 may be remotely located from the user interface and viewer, and the video sequences can be transmitted over the Internet to a host site. The host site may have a plurality of photos categorized by mood, at least one of which can be sent to the viewer as a virtual photo album. The mood of the viewer would be the primary determinant as to what types of photos in the set of photos are provided in the virtual photo album on any particular viewing and/or to any particular viewer.

The camera should be positioned so as to accurately focus on the expression of the viewer. Facial expressions, such as smiles, frowns, smirks, lip biting, tears, are just a few criteria that are indicia of a viewer's mood that are recorded by the camera and transmitted to the processor. By way of illustration and not limitation, U.S. Pat. No. 5,367,454 to Kawamoto et al., which is hereby incorporated by reference as background material, discloses that different human emotions include fear, surprise, disgust, anger expectation, joy and acceptance.

The processor may contain a facial expression recognition database and recognition module 215 or program in a storage area. The database would have a plurality of facial expressions, with each facial expression having an associated category of a mood, such as happy, sad, afraid, disgusted, angry, anxious, etc. A pattern recognition program distinguishes features of the facial expression of the viewer and compares it via a comparator module with a previously stored facial expression to determine the mood of the viewer.

For example, a comparison of the features of the viewer's mouth with images from storage area 215, can be used to detect whether a person is smiling. For example, if the ends of the lips mouth are curved upward, or positioned relatively higher than the middle portion of the lips, this could be recognized as a happy image. A mouth having lips which are positioned lower relative to the central portion could be indicative of a frown. Clenching or pulling the lips together may also be indicative of sadness.

As the lips are normally a uniform shade and relatively oval, the shade of the pixels could be used to determine the position of the mouth and surrounding areas of the face. The pixel changes could also be used to identify tears, and thus determine the viewer is sad.

One way the pattern recognition can work is that the viewer sends snapshots from the attached camera and flags the photos as expressions of the viewer when happy, sad, angry, anxious, afraid, disgusted, etc. Such expressions would serve as the basis for comparison 230 for subsequent images of facial expressions. The pattern recognition module would then compare a current facial expression of the viewer with facial expressions of the viewer in storage and determined the overriding emotion of the viewer.

Alternatively, the categorized moods of facial images in storage area 215 may include images of the respective viewer. These images could be captured after showing the viewer a series of photographs that common cause certain facial expressions. For example, a photo of a dangerous animal, such as a polar bear about to attack, or a shark, could be shown to someone as their facial expression is captured by the camera. Whether a person experiences, for example, fear from a photograph tends to be subjective, which is why the initial flagging of an emotion may be a more accurate method to detect one's mood.

In addition, the pattern recognition module could be preprogrammed with facial expressions of people other than the viewer, which would eliminate the need for the viewer to provide initial feedback regarding their particular emotion associated with a particular facial expression. It will be noted by persons of ordinary skill in the art that a more complex pattern recognition module would be required to correlate the facial expressions of, for example, anxiousness from a plurality of samples of other people preprogrammed into the database and that of the current viewer.

The pattern recognition module would provide information regarding the determined emotion to a retrieval module 220. The retrieval module would use the determined emotion as a filter to block out all photos except for those that either would change the determined emotion, or possibly keep it the same, depending on the type of emotion determined. The photos for transmission and display to the viewer are retrieved from database 225, and are also categorized at least by mood.

For example, when it is determined that the current emotion of the viewer is sadness, images in the virtual photo album can be sent to change the emotion to happiness. However, if the current emotion is happiness, the images retrieved might be those which have been previously determined, either by direct association, or by heuristically iterations of previous viewings of the photo album by the viewer, to retain the emotion of happiness. There can be a constant monitoring of the viewer's current facial expression, and the group of photos in the virtual photo album may be updated according to changes in the facial expression of the viewer.

The pattern recognition may be heuristic, where the feedback from the mood based photos is ranked according to the change in expression. Future virtual photo albums for a specific viewer could provide photos that provide, for example, the largest smile from the viewer from previous virtual photo sessions. Photos that would be considered soothing for a nervous or upset viewer, may not evoke the same response in subsequent viewing sessions. However, photos that illicit smiles, or even laughs, might be most enjoyable the first time they are viewed, and there may be less pleasure generated at subsequent viewings. These responses could be tracked for future viewers, where, for example, there is a high probability that a viewer would smile upon the initial viewing of a certain photo. If previous viewers react with less happiness after subsequent viewings, that particular photo might be preferably shown only once to the viewer. There could also be tracking, for example, by placing cookies on a viewer's computer by the website, so that the amount of time between viewings is factored into to whether the viewer will see some of the same photographs in future virtual photo albums.

Of course, there are variations in generic expressions that should be taken into account. For example, some people may smile when nervous, but that is not an indication of happiness. There is normally a distinguishable characteristic in a nervous smile, as opposed to a comedic smile, or a smile when one sees a loved one. Thus differently categories of the same facial expression may have sub-categories, so that the pattern recognition module can determine a nervous smile from a happy smile, and the retrieval module can send the appropriate group of photos in the virtual photo album.

In addition, one may normally experience joy when seeing a photo of a child or spouse, but should the viewer be upset at the person in the picture, normal emotions could be supplanted by feelings of anger or anxiety. Additionally, for example, the photo of a loved one who is now deceased may bring sadness instead of the previous reactions of joy. The pattern recognition may keep a count where if a previously favored photo now illicits a negative response on more than one occasion, that photo may be removed from the possible combination of photos presented to a viewer.

In another aspect of the invention, the viewer could provide some identifying information, or it may be extracted by the website. Such identifying information could be the zip code or other geographic location of the viewer. A correlation module can, for example, check the weather/temperature of the viewer's identifying zip code. If the geographic located is currently cold and snowing, the virtual photo album might send photos of a fireplace, or cups of hot chocolate, or snow-related activity such as skiing and snow mobiling. Should the weather be extremely hot, pictures of the beach, or of normal outdoor activities in the summer could comprise part of the virtual photo album. If it is raining, the photos can comprise sunny outdoor photographs, rainbows, flowers, etc. In each case, there can be feedback of the viewer's facial expression, and the photos provided for viewing can be adjusted accordingly.

In addition, the time of day, date, weather, number of people in the room, and the background illumination sensed by the camera, could also serve as a basis to modify the retrieval of photos. Additionally, the viewer could select or initially identify preferred activities as modifying factors for the type and order of photos retrieved and displayed. Each basis to modify the retrieval should have corresponding identifiable criteria labeling the photos in storage. For example, photos of baseball players could have a unique identifier, and if the viewer expresses a like for baseball, such photos could be retrieved for display.

In yet another aspect of the present invention, the viewer might indicate a preference for what should be shown for a particular facial expression. For example, if the determined emotion is sadness, a person who likes dogs might indicate that photos of puppies are desirable to change one's mood to happiness. Another person may have a preference to photos of kittens. The categories can be personalized to include, for example, photos of automobiles, sports, arts, crafts, hobbies, etc. In each case, the retrieval module would select a certain group of images based on the determined emotion from the pattern recognition module, and the preferences indicated by the viewer when a specific emotion is determined.

The pattern recognition module may be located in a storage area. This storage can be localized ROM/RAM, flash, etc., or it could be a server on a network.

Various modifications may be made by person of ordinary skill in the art, which is within the spirit of the invention and the scope of the appended claims. For example, the emotional identifiers may comprise more emotions or less emotions, the expressions within a category (such as smiling) can be ranked according to the amount of relative degree of expression for each particular type of facial expression.

What is claimed is:

1. A method for providing a mood based virtual photo album, said method comprising the steps of: (a) capturing a first image of a facial expression of a viewer by a camera; (b) providing the image of said facial expression to a pattern recognition module of a processor; (c) determining a mood of said viewer having an associated emotional identifier by comparing the facial expression with a plurality of previously stored images of facial expressions having an associated emotional identifier that indicates a mood of each of said plurality of previously stored images; (d) retrieving from storage a set of photos to be transmitted to said viewer based on the emotional identifier associated with the mood determined in step (c); and (e) transmitting the set of photos retrieved in step (d) to said viewer for display in the form of an electronic photo album.

2. The method according to claim 1, wherein the set of photos in step (e) is transmitted over the Internet to said viewer, and said electronic photo album comprising a virtual photo album.

3. The method according to claim 1, wherein the pattern recognition module in step (b) is a locally attached computer.

4. The method according to claim 2, wherein the pattern recognition module in step (b) is a web-based processor.

5. The method according to claim 1, wherein the previously stored images in step (c) are facial expressions of the viewer.

6. The method according to claim 4, further comprising providing the previously stored images of the facial expression of the viewer with emotional identifiers.

7. The method according to claim 6, wherein the emotional identifiers are supplied by the viewer to designate a particular mood for the facial expression for each respective image of said plurality of previously stored images.

8. The method according to claim 4, wherein the previously stored images in step (c) are facial expressions of the viewer.

9. The method according to claim 8, further comprising providing the previously stored images of the facial expression of the viewer with emotional identifiers.

10. The method according to claim 9, where in the emotional identifiers are supplied by the viewer to designate a particular mood for the facial expression for each respective image of said plurality of previously stored images.

11. The method according to claim 4, further comprising: (f) capturing a second image of a facial expression of the viewer subsequent to said viewer looking at least at one photo of said set of photos transmitted in step (e); (g) updating the set of photos transmitted in step (e) by repeating steps (c), (d) and (e) according to the second image of the facial expression captured in step (f).

12. The method according to claim 4, wherein the image of the facial expression is captured as one of a JPEG image, TIFF image, BMP image and PCX image.

13. The method according to claim 4, wherein the image of the facial expression is a video sequence.

14. The method according to claim 13, wherein said video sequence comprises an MPEG sequence.

15. The method according to claim 4, wherein step (c) includes (1) modifying the emotional identifier associated with the mood of the viewer according to at least one of: (i) local weather; (ii) other people adjacent to the viewer; (iii) illumination adjacent the viewer; (iv) time of day; (v) date; and (vi) preferred activities of the viewer.

16. The method according to claim 15, wherein step (d) includes transmitting an order of the set of photos according to the modification to the emotional identifier in step (c)(1).

17. A system for a mood based virtual photo album comprising: a camera; user interface means for transmitting a first image of a facial expression of a viewer captured by said camera; a processor for receiving the transmitted image of the facial expression of said viewer; said processor comprising a pattern recognition module for comparing the image received by said processor with a plurality of images of facial expressions stored in a storage area, and for determining a mood of the viewer according to the first image of the facial expression captured by said camera; retrieval means for retrieving a set of electronic photos corresponding to the mood of the viewer determined according to the first image of the facial expression and transmitting said set of electronic photos to said viewer; and a display for displaying said set of photos to the viewer as a virtual photo album.

18. The system according to claim 17, wherein said user interface means includes feedback means for transmitting subsequent images of said viewer's facial expression after a display of at least one photo of said set of photos; wherein said pattern recognition module of said processor compares said subsequent images of said viewer's facial expression for determining the mood of the viewer according to said subsequent images; and said retrieval means retrieves a respective set of electronic photos corresponding to the mood of the viewer determined according to each of said subsequent images of the viewer's facial expression.

19. The system according to claim 17, wherein said user interface means transmits said first image to said processor as one of a JPEG image, TIFF image, BMP image and PCX image.

20. The system according to claim 18, wherein said user interface means transmits said subsequent images to said processor as at least one of JPEG images, TIFF images, BMP images and PCX images.

21. The system according to claim 17, wherein said processor comprises a host site, and said camera and said user interface means for transmitting said captured image communicate with said processor over the Internet.

22. The system according to claim 18, wherein said processor comprises a host site, and said camera and said user interface means for transmitting said captured image communicate with said processor over the Internet.

23. The system according to claim 21, wherein said set of electronic photos transmitted by said retrieval means to said viewer comprises a virtual photo album.

24. The system according to claim 22, wherein said set of electronic photos transmitted by said retrieval means to said viewer comprises a virtual photo album.

25. The system according to claim 20, wherein at least one of said first image and said subsequent images comprises video sequences.

26. The system according to claim 25, wherein a format of said video sequences is one of MPEG, MPEG-1, MPEG-2 and MPEG-3.

27. The system according to claim 17, wherein said user interface means includes means for initially inputting photos of facial expressions of said viewer for storage in said storage area of said processor, each one of said photos having an associated emotional identifier that indicates a mood represented by each respective facial expression of said each one of said photos.

28. The system according to claim 18, wherein said user interface means includes means for initially inputting photos of facial expressions of said viewer for storage in said storage area of said processor, each one of said photos having an associated emotional identifier that indicates a mood represented by each respective facial expression of said each one of said photos.

29. The system according to claim 21, wherein said user interface means includes means for initially inputting photos of facial expressions of said viewer for storage in said storage area of said processor, each one of said photos having an associated emotional identifier that indicates a mood represented by each respective facial expression of said each one of said photos.

30. The system according to claim 22, wherein said user interface means includes means for initially inputting photos of facial expressions of said viewer for storage in said storage area of said processor, each one of said photos having an associated emotional identifier that indicates a mood represented by each respective facial expression of said each one of said photos.

31. The system according to claim 25, wherein said user interface means includes means for initially inputting photos of facial expressions of said viewer for storage in said storage area of said processor, each one of said photos having an associated emotional identifier that indicates a mood represented by each respective facial expression of said each one of said photos.

32. The system according to claim 26, wherein said user interface means includes means for initially inputting photos of facial expressions of said viewer for storage in said storage area of said processor, each one of said photos having an associated emotional identifier that indicates a mood represented by each respective facial expression of said each one of said photos.

* * * * *